US007526498B2

(12) United States Patent
Dubovsky

(10) Patent No.: US 7,526,498 B2
(45) Date of Patent: Apr. 28, 2009

(54) METHOD FOR GENERATING DATA STRUCTURES FOR AUTOMATICALLY TESTING GUI APPLICATIONS

(75) Inventor: David Dubovsky, Boca Raton, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 1 day.

(21) Appl. No.: 09/952,341

(22) Filed: Sep. 14, 2001

(65) Prior Publication Data
US 2003/0055836 A1 Mar. 20, 2003

(51) Int. Cl.
*G06F 7/00* (2006.01)
*G06F 17/00* (2006.01)

(52) U.S. Cl. ...................................... 707/102; 707/101

(58) Field of Classification Search .................. 707/205, 707/100–103, 104.1; 714/4, 38, 46, 45, 31
See application file for complete search history.

(56) References Cited

U.S. PATENT DOCUMENTS

| | | | |
|---|---|---|---|
| 5,138,140 A | 8/1992 | Siemiatkowski et al. | 235/462 |
| 5,367,619 A | 11/1994 | Dipaolo et al. | 395/149 |
| 5,410,254 A | 4/1995 | Consiglio | 324/456 |
| 5,475,843 A | 12/1995 | Halviatti et al. | 395/700 |
| 5,594,892 A | 1/1997 | Bonne et al. | 395/500 |
| 5,594,910 A | 1/1997 | Filepp et al. | |
| 5,596,714 A | 1/1997 | Connell | 395/183.14 |
| 5,634,002 A | 5/1997 | Polk et al. | 395/183.14 |
| 5,640,537 A | 6/1997 | Jessen et al. | 395/500 |
| 5,649,073 A | 7/1997 | Knox et al. | 395/109 |
| 5,675,260 A | 10/1997 | Consiglio | 324/763 |
| 5,761,683 A | 6/1998 | Logan et al. | 707/513 |
| 5,781,720 A * | 7/1998 | Parker et al. | 714/38 |
| 5,892,947 A | 4/1999 | DeLong et al. | |
| 5,926,638 A | 7/1999 | Inoue | 395/704 |
| 5,943,048 A | 8/1999 | Nyman | 345/334 |
| 6,041,363 A * | 3/2000 | Schaffer | 719/321 |
| 6,275,976 B1 | 8/2001 | Scandura | |
| 6,308,146 B1 | 10/2001 | La Cascia, Jr. et al. | 703/22 |
| 6,360,332 B1 * | 3/2002 | Weinberg et al. | 714/4 |
| 6,622,298 B1 | 9/2003 | Stamm | 717/125 |
| 6,662,312 B1 | 12/2003 | Keller et al. | |
| 6,701,514 B1 | 3/2004 | Haswell et al. | |
| 6,766,475 B2 | 7/2004 | Segal et al. | 714/38 |
| 2002/0091968 A1 | 7/2002 | Moreaux et al. | 714/38 |

(Continued)

OTHER PUBLICATIONS

Memon et al., "Coverage Criteria for GUI Testing", ACM 2001, pp. 256-267.

*Primary Examiner*—Don Wong
*Assistant Examiner*—Merilyn P Nguyen

(57) ABSTRACT

The invention relates to methods for generating data structures for use with an environment based data driven test engine for computer programs which have a graphical user interface (GUI). The methods are used in connection with a scriptable GUI test tool. The tool generates a GUI map (or includes a utility which generates a GUI map), at least one environment definition (parameter) file, at least one test data (driver) file, and an automated test engine. A separate environment definition file is provided for each feature of the GUI. The automated test engine (ATE) is composed of a plurality of library modules written in the scripting language of the scriptable GUI test tool. The ATE is driven by the test data file and calls upon the GUI map and environment definition file.

20 Claims, 5 Drawing Sheets

U.S. PATENT DOCUMENTS

2003/0051086 A1    3/2003  Smith et al. ................. 710/106
2005/0246390 A1*  11/2005  House et al. ................ 707/200
2007/0022407 A1*   1/2007  Givoni et al. ............... 717/124

* cited by examiner

FIG. 4

METHOD FOR GENERATING DATA STRUCTURES FOR AUTOMATICALLY TESTING GUI APPLICATIONS

This application is related to, and commonly assigned with, the following now-issued, applications, each of which was filed coincident with the present application on Sep. 14, 2001, in the name of David Dubovsky: application Ser. No. 09/952,245, entitled "Data Structures For Use With Environment Based Data Driven Automated Test Engine For GUI Applications," now-issued as U.S. Pat. No. 6,948,152 B2; and application Ser. No. 09/952,250, entitled "Environment Based Data Driven Automated Test Engine For GUI Applications," now-issued as U.S. Pat. No. 6,961,873 B2.

BACKGROUND OF THE INVENTION

1. Field of the Invention

The invention relates to methods and apparatus for testing computer programs. More particularly, the invention relates to methods for generating data structures for use with an environment based data driven test engine for computer programs which have a graphical user interface (GUI).

2. Brief Description of the Prior Art

Computer programs consist of lines of individual instructions that are read and executed by a processor. Early computer programs were not "interactive". They consisted of a set of instructions that were designed to be read and executed starting with the first instruction and ending with a last instruction. If one of the instructions contained an error, the processor would halt the program when it tried to execute the defective instruction. The programmer would then need to review all of the instructions to determine which one was defective. Although this task of manually "de-bugging" a computer program was tedious, it was possible because early computer programs were relatively short.

As computer programs grew in length and complexity, automated de-bugging tools became necessary. An early de-bugging tool would simply identify which instruction caused the program to halt. This was generally sufficient for debugging a simple linear program, but in the case of looping programs, an instruction might function in some modes and malfunction in other modes.

Today, even "simple" computer programs are very large, often consisting of millions of instructions. Moreover, most of today's computer programs are "interactive", i.e. require interaction with the user of the program. Thus, a defective instruction in the program might only be discovered in the case of a particular user action. Furthermore, most of today's computer programs have a graphical user interface (GUI). A GUI typically includes various elements, referred to as "objects", including "windows", "menus", "icons", "dialog boxes", "lists", "radio buttons", "check boxes", "text entry fields", etc. De-bugging a program that has a GUI is doubly complex because, in addition to the instructions for the program to carry out computing tasks, the program also includes instructions for managing the GUI.

There are several known testing tools for de-bugging GUI applications. One such tool is WinRunner® from Mercury Interactive Corporation, Sunnyvale, Calif. WinRunner® is a testing tool which verifies that GUI applications work as expected. By capturing, verifying and replaying user interactions automatically, WinRunner® identifies defects in multiple processes.

With WinRunner®, tests are created by recording user actions. As a test is recorded, check-points are created to compare expected outcomes with actual outcomes. Each time a test is recorded, a GUI map is created. The GUI map contains a list of all of the objects and object attributes used by the test. Each test is recorded using an editable test scripting language (TSL).

A disadvantage of most GUI testing tools, including WinRunner®, is that a separate test script must be created for each GUI application feature. Several thousand test cases (or steps) have to be executed manually with manual and/or visual verification of test results. Repetitive manual execution of test cases is required in order to verify correction of faults or to re-verify functionality of an application after any new production of the application under test. Record and replay operations for generating repeatable test cases require test script (code) modifications for each error found or new test case identified. The modifications themselves require thorough testing before the actual test result quality can be assured. New objects or fields that are added to the GUI application or objects that are moved or removed have a significant impact on all previously recorded test cases even though the behavior of the application has not changed.

Generally, the principles of data driven testing in the prior art include data for automatic test execution according to preprogrammed sequences. However, the data provided to drive the testing does not include data that can be used to define the environment. Taken together, the environment and associated behavior of GUI objects in that environment require specific code or test scripts to be generated and tested. New applications or modifications to an existing application under test cannot be implemented without significant test software development. A significant investment in manpower is required to implement, maintain and enhance the test software that is not reusable.

SUMMARY OF THE INVENTION

It is therefore an object of the invention to provide a data driven test engine for GUI applications.

It is also an object of the invention to provide a data driven test engine for GUI applications which is environment based.

It is another object of the invention to provide a data driven test engine for GUI applications which is automated.

It is yet another object of the invention to provide a data driven test engine for GUI applications which tests all of the features in a single test script.

It is another object of the invention to provide the maximum flexibility for test case generation, maintenance and execution required during the development and test cycle of a GUI software project.

It is still another object of the invention to reduce the investment in manpower to implement, maintain and enhance automated test software.

It is another object of the invention to provide a data driven test engine for GUI applications where modifications to the test engine are required only when a new behavior of an object on the GUI is introduced.

In accord with these objects which will be discussed in detail below, the methods and apparatus according to the invention include a scriptable GUI test tool which generates a GUI map (or which includes a utility that generates a GUI map), at least one environment definition (parameter) file, at least one test data (driver) file, and an automated test engine. As used herein when it is stated that a GUI test tools generates a GUI map it is to be understood that the GUI test tool may provide a separate utility which generates the GUI map.

A separate environment definition file is provided for each feature of the GUI. Each environment definition file provides the abstract details required by the test engine in order to support common processes for different applications. Because the test engine is not hard coded to know the details of the application or object being tested, specific variables are initialized and defined as external data via the environment definition file. Information such as Application Name, Launch Menu, Primary Window identification, Tab and related tab windows are identified in the "Environment" section of this file. The individual fields that appear in the application object are also defined in this file using the "Parameters" section. The behavior of the parameter is defined by assigning a "Type" definition that has already been implemented in the test engine. It is possible to maintain application version compatibility in a single environment definition file by identifying parameter elements that are new to a specific version of an application. The values found in the environment definition file are tightly bound to the logical names that are used in the GUI map.

The key to the structure of the test data file is the "Parameter" section of the environment definition file. The test data file is organized into rows of data where each row defines a single test and each column represents a parameter. Occasionally, multiple rows of data are required in order to facilitate or verify the results of an individual test. The data begins with a definition of the default values that are expected for each field (parameter). This single line of data is followed by one or more rows of individual data driven tests. Each row consists of standard fields and the data specific for each field of the object being tested. Standard fields include a Test ID, Preamble and Postamble action, Expected Result indication and a Comment. Preamble and Postamble actions are usually application specific and represent user actions required to establish a starting point for a test and the action to perform to execute the desired test. The test case ID is reported in a log file for tracking purposes. The expected results field indicates whether the test will pass completely or fail during data entry, during the execution of the preamble, postamble or during verification after the postamble action has been executed. Data that appears in the individual fields of a data driven test are specific for the parameter, operation or the use of the field. Fields can be ignored, changed, left alone or ignored for Query operations. Data can also represent multiple columns of a table structure.

The automated test engine (ATE) is composed of a plurality of library modules written in the scripting language of the scriptable GUI test tool. The ATE is driven by the test data file and uses the GUI map and environment definition file.

According to the presently preferred embodiment, the scriptable GUI test tool is WinRunner®. The environment definition files and the test data files are preferably generated with a spreadsheet program such a Microsoft Excel® and saved as comma delimited text files for use by the ATE.

BRIEF DESCRIPTION OF THE DRAWINGS

FIG. 4 is a screen shot illustrating the layout of a parameter file according to the invention.

BRIEF DESCRIPTION OF THE APPENDIX

The included CDROM appendix contains the following files:
/
  VoiceStation.xls
  PeripheryBoards.xls
  Engine/
    Actions
    Common2All
    CustomSupport
    General
    HDMS_CM_ZincInit
    obj_main
    ParmSetCheck
    PopUpHandler
    Setbaselines
    SiteInitV52
    TestInit.

DETAILED DESCRIPTION

Figure 1:
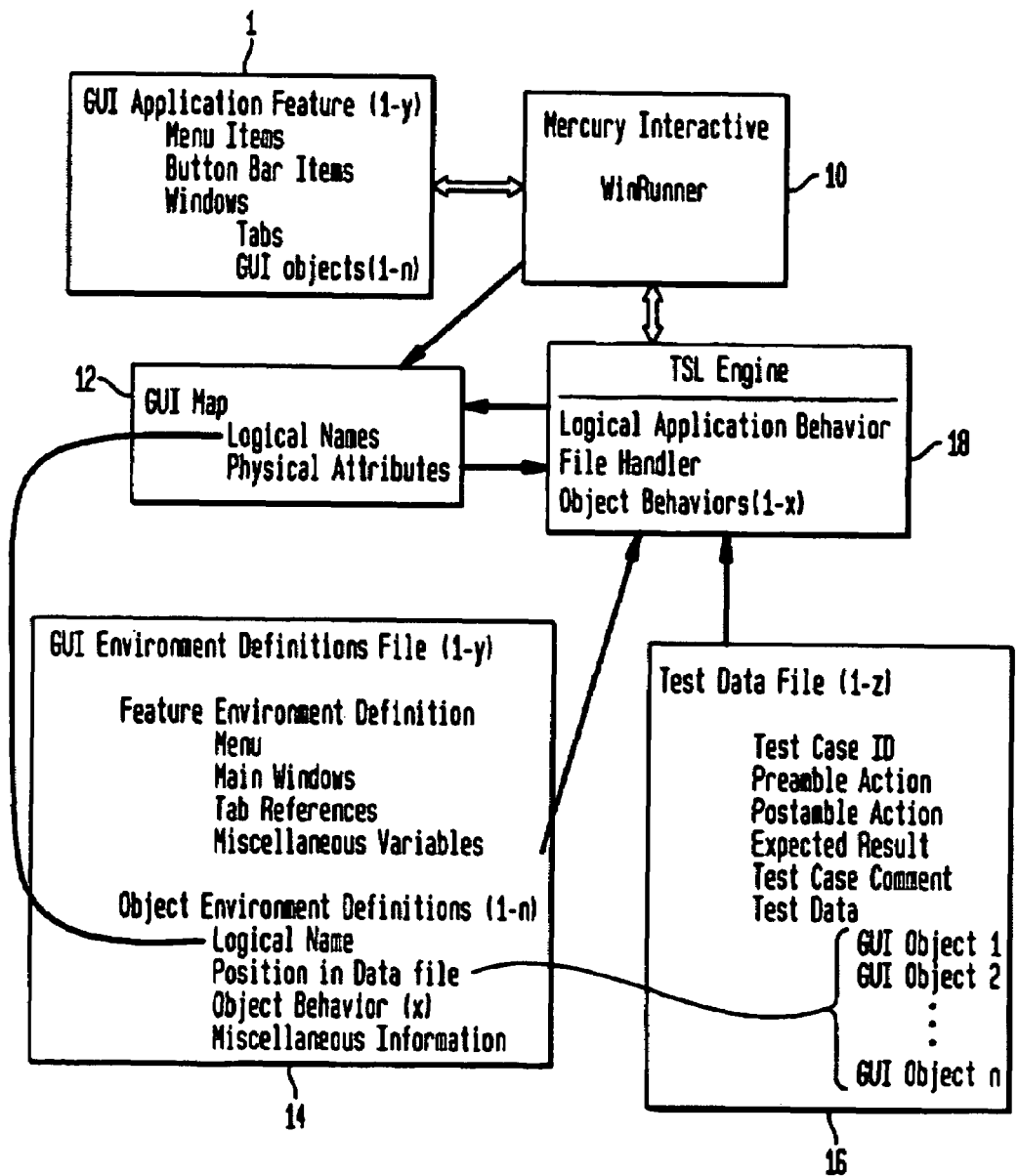
FIG. 1 is a schematic architectural overview of the invention.

Turning now to FIG. 1, the methods and apparatus according to the invention include a scriptable GUI test tool 10 which generates GUI map 12, at least one environment definition (parameter) file 14, at least one test data (driver) file 16, and an automated test engine 18. According to the presently preferred embodiment, the GUI test tool 10 is WinRunner®.

As illustrated in FIG. 1, a GUI application 1 has y number of features. Each may include menu items, button bar items, windows, tabs and up to n number of GUI objects. GUI objects may include user input interface objects such as check boxes, radio buttons, text fields, etc.

The GUI map 12 generated by the test tool 10 includes the logical names and physical attributes for each of the GUI objects. A separate environment definition (parameter) file 14 is provided for each of the y number of GUI application features. Each parameter file 14 includes a feature environment definition which may include menus, windows, tab references and miscellaneous variables. The parameter file 14 also includes up to n number of object environment definitions. Each object environment definition includes a logical name, an indication of its position in the data file 16, x number of object behaviors, and miscellaneous information. According to the presently preferred embodiment, the parameter file 14 is saved as a comma delimited text file but it is created and managed as a spreadsheet file. The column and row structure inherent in a spreadsheet file make it easier to manage than a delimited text file. Two examples of a parameter file are contained on the CDROM appendix as a tab in Microsoft® Excel® spreadsheet files entitled PeripheryBoards.xls and VoiceStation.xls.

A separate test data (driver) file 16 is provided for each of z number of tests. The number of tests is selected by the user. Each test may be simple or complex. Generally, each test data file includes a test case ID, a preamble action, a postamble action, an expected result, a test case comment, and test data for each of n number of GUI objects. Two examples of a driver file are contained on the CDROM appendix as a tab in Microsoft® Excel® spreadsheet files entitled PeripheryBoards.xls and VoiceStation.xls.

A single test engine script 18 is provided for each GUI application to be tested. The test engine script 18 interacts with the WinRunner® application 10 and the GUI map 12. It also reads from the parameter file 14 and the driver file 16. According to a presently preferred embodiment, a test engine script is composed of a plurality of library modules written in the scripting language of the scriptable GUI test tool 10. The test engine is driven by the test data file 16 and calls upon the GUI map 12 and environment definition file 14 during execution. An example of a test engine script is contained on the CDROM appendix as a number of text files in the directory entitled "engine".

Figure 2:
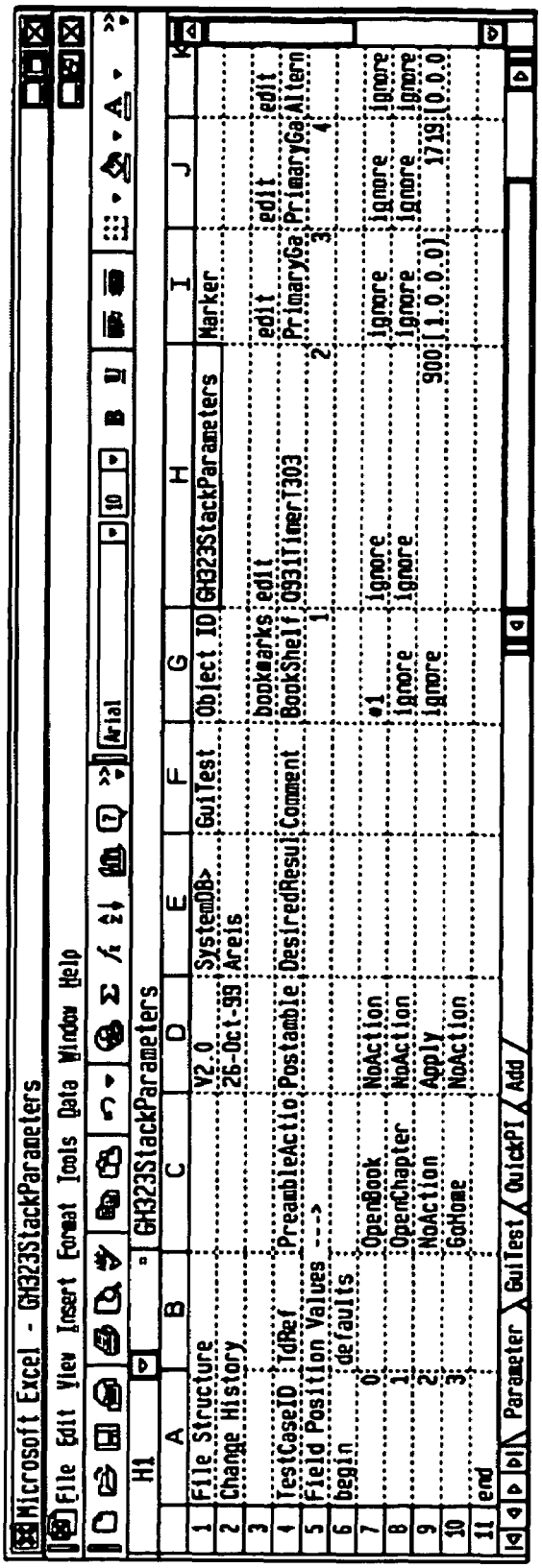
FIG. 2 is a screen shot illustrating the layout of a driver file according to the invention.

Turning now to FIG. 2, the driver file (16 in FIG. 1) is preferably created in a spreadsheet application and saved as a comma delimited text file for use with the test engine script (18 in FIG. 1). As shown in FIG. 2, the file is organized into rows of data where each row defines a single test and each column represents a parameter. Occasionally, multiple rows of data are required in order to facilitate or verify the results of an individual test. The data begins with a definition of the default values that are expected for each field (parameter). This single line of data is followed by one or more rows of individual data driven tests. Each row consists of standard fields and the data specific for each field of the object being tested.

The standard fields include a Test ID, Preamble and Postamble action, Expected (Desired) Result indication and a Comment. Preamble and Postamble actions are usually application specific and represent user actions required to establish a starting point for a test and the action to perform to execute the desired test. The test case ID is reported in the log file for tracking purposes. The expected results field indicates whether the test will pass completely or fail during data entry, during the execution of the postamble or during verification after the postamble action has been executed.

Data that appears in the individual fields of a data driven test are specific for the parameter, operation or the use of the field. Fields can be ignored, changed, left alone or ignored for Query operations. Data can also represent multiple columns of a table structure.

More specifically, line 1 includes the directory structure for the specific Excel.RTM. tab. Column "D" includes the Version ID for subdirectory management. Column "F" includes the Test Suite Directory name. Column "H" includes the Object ID—or, actually, the Name of the file.

Line 2 begins a History of Change section specific for the tab. Additional rows should be added in order to maintain a reasonable record of the significant changes made to the data in this file. The History record should include the initials of the tester, the date of the change and a brief description of he change.

Figure 4:
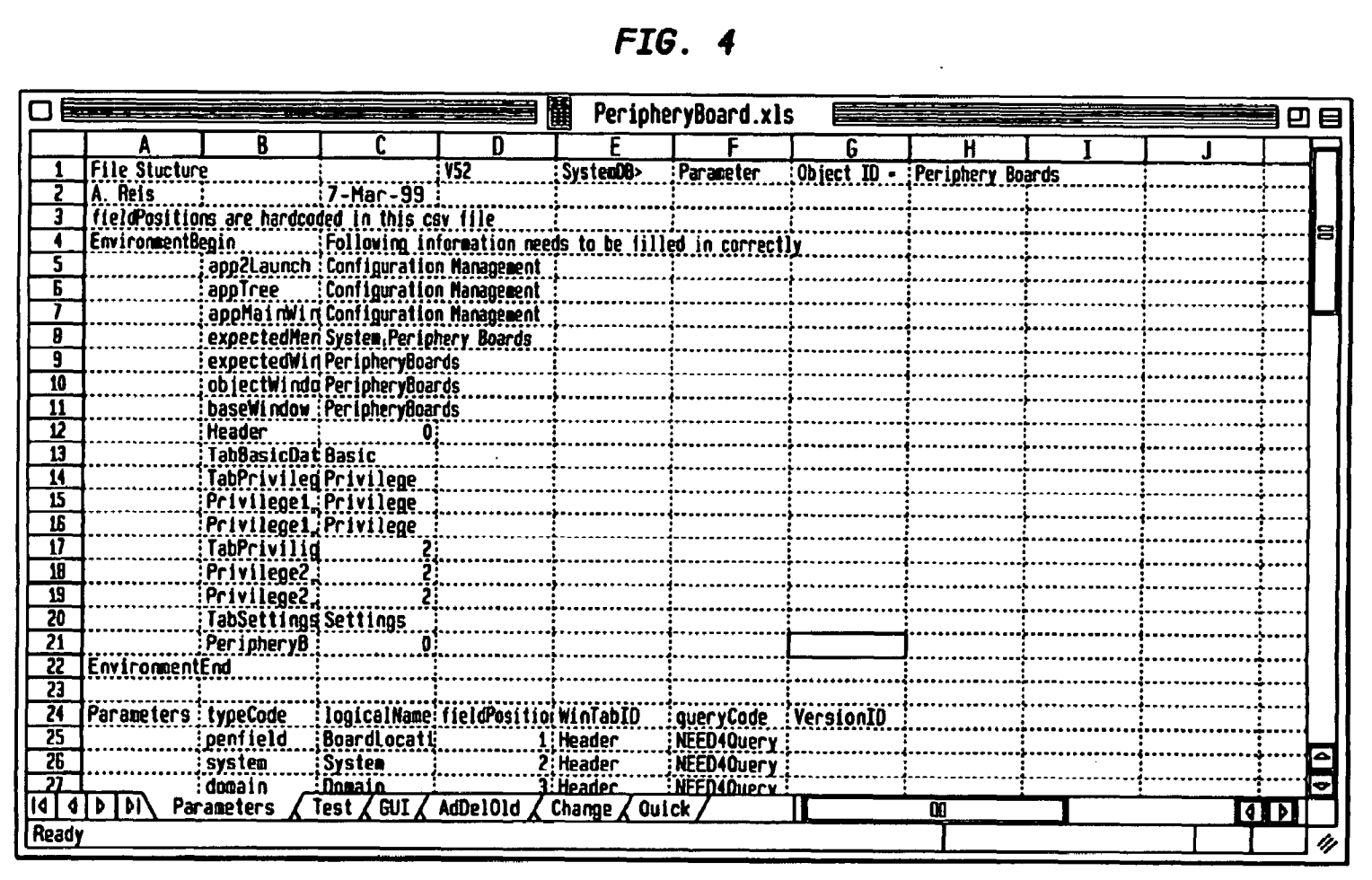

Three lines are copied from columns of the parameter tab (FIG. 4). All of the typeCode, logicalName and the fieldPosition columns are selected (and copied) from the parameter file and by using paste special with transpose enabled the columns are converted to rows. By selecting Column "G" in the destination file as the paste destination the information is accurately reproduced for reference while generating data for the test cases that will follow.

The standard data beginning with line 4 in FIG. 2 includes: Column "A", Test Case identifier; Column "B", Test Director ID; Column "C", Preamble Action; Column "D", Postamble Action; Column "E", Desired Result Code, Column "F", Optional Comment; and Column "G", begins the field names.

Figure 3:
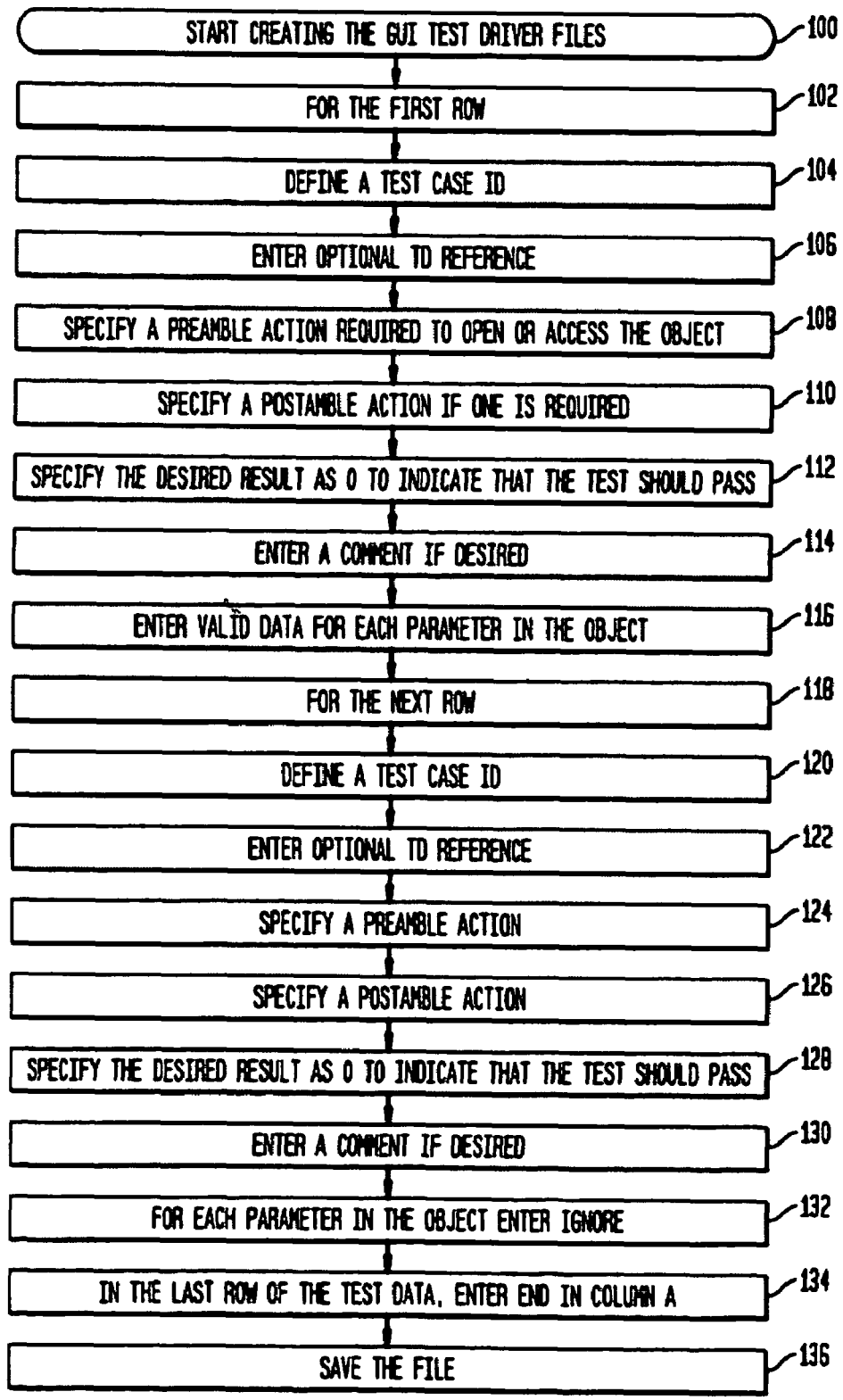
FIG. 3 is a flow chart illustrating the steps in creating a driver file.

Turning now to FIG. 3, the steps for creating a GUI test driver file are illustrated in a flow chart. The process begins at 100. For the first row of the file starting at 102: a test case ID is defined at 104; an optional TD reference is entered at 106; the preamble action required to open or access the object is entered at 108; the postamble action, if one is required, is specified at 110; the desired result is entered at 112; an optional comment is entered at 114; and valid data for each parameter in the object is entered at 116.

For the next row starting at 118: a test case ID is defined at 120; an optional TD reference is entered at 122; the preamble action required to open or access the object is entered at 124; the postamble action, if one is required, is specified at 126; the desired result is entered at 128; an optional comment is entered at 130; and "ignore" is entered for each parameter in the object at 132. As described in more detail hereinafter "ignore" is not always required in every field although sometimes it may be necessary.

In the last row of the test data, END is entered in Column A at 134 and the file is saved at 136. As mentioned above, the file is saved as a comma delimited text file for use with the test engine script. It will be appreciated that the native spreadsheet file will also be saved for further development.

The test case ID serves two purposes. First, it is used as a trace value in the log file that is created during execution of the test engine providing a means to relate the run results to the driver file input. Secondly, and more importantly, it allows test steps to be grouped into test cases providing a structure for a complete run sequence. A test case numbering convention is utilized to facilitate both of these issues. Normally the first test case facilitates the "Opening" of an object or the initial access to the object to be tested. This test case is usually numbered "0" or "1". Normally the last test case facilitates the "closing" of the object under test or the exit from the object and it is best to provide a very high number as the Test Case ID e.g. "99999". Since a test case may actually require more than one step, or row, in the driver file to complete the requirements for a test, it is necessary to be able to group test steps into test cases. This is accomplished by utilizing the following sequence for numbering the Test Case ID.

1.000 Initial step of a sequence for Test Case 1
1.010 Second step of a sequence
1.020 Third step of a sequence
1.025 Second sub step of step 2 of test case 1
1.090 Final step of the sequence for test case 1
2.000 Begin test case 2
2.010 $2^{nd}$ step
2.090 Final Step of test case 2
etc.

Note that it is possible for any one of the individual steps to be an actual "Test Case" as defined and documented in the Test Director. Therefore, an appropriate TdRef value can be assigned each of the steps. The TdRef value can be reused in each of the sequences since the TestCaseID is unique.

It is also possible to enter a "skip code" in a test case ID to be able to skip a Test Case. This simplifies editing of the driver file. A skip code is identified at run time to indicate a specific set of test cases that should not be executed. According to one embodiment of the invention, only one skip code is used at a time. According to alternative embodiments of the invention, multiple skip codes could be used and/or codes for performing (rather than skipping) tests are contemplated.

A reference to Test Director test case name includes the subject path to resolve duplicate test case names.

The Preamble Action is used to establish the initial conditions for an individual "step". It is expected that the preamble always works. Examples of preamble actions are: OpenBook, OpenChapter, SelectRow, NoAction, and Reload.

The Postamble Action defines the user action that will be performed after the data has been entered. Examples of postamble actions are: No Action, Apply, Commit, DeleteRow, Stop, Start, and Restart.

Expected Results defines what should happen as a result of this test case. The test engine is currently designed to detect only one fault per line. The values of the Expected Result fields are used to determine at which point a fault might (is expected) to occur. The presently preferred values for expected results are as follows:
=0 All phases of the test are expected to pass,
=1-999 An error is expected on input/outut of the field specified,
=1000 An error is expected on execution of the Postamble action,
=1xxx A verification error is expected after the postamble action on field xxx,
=2000 An error is expected during execution of the Preamble Action.

The Comment Field is optional and it is used for any necessary comments that helps to clarify a Test Case. It will be appreciated that a comma should not be used in this or any other field since the file will be saved to a comma delimited text file.

Special Data Values are provided for parameter manipulation. These include:
- default=There is to be no data input into the field but the default value should be expected as a result of the specified action,
- nochange=The value that is in the field as result of the previous action should remain and the same value should be used as the expected result value for the specified parameter,
- ignore=The field will not be changed and it will not be evaluated for expected result verification,
- BlankQuery=The field is marked as NEED4Query in the parameter file but for a specific test case it will not be utilized. This is used when there are two fields that can be used for a query, but only one field is required.

Turning now to FIG. 4, the basic format of the parameters (environment definition) file is shown in a screen shot of a spreadsheet file. This file provides the abstract details required by the common engine components in order to support common processes for different applications. Because the engine is not hard coded to know the details of the application or object (logical grouping of data for an application), specific variables must be initialized and defined as external data. Throughout the common engine functions, a reference to the array structure called "VitalInfo", is used to access these object specific variables. Information such as Application Name, Launch Menu, Primary Window identification, Tab and related tab windows are identified in the "Environment" section of this file.

The individual fields that appear in the application object are also defined in this file using the "Parameters" section. The behavior of the parameter is defined by assigning a "Type" definition that has already been implemented in the test engine. It is possible to maintain application version compatibility in a single environment file by identifying parameter elements that are new to a specific version of an application. The values found in this file are tightly bound to the logical names that are used in the GUI map.

The definition of each object to be tested includes logical names, menus, expected windows, tab window names, links, and object attributes. The parameter value types include edit, checkbox, list, display only, radio, and other types for specific applications.

In particular, the parameter section of the file includes typeCode as supported by the test engine, logicalname as defined by the GUI map, fieldposition in numerical order, WinTabID (an environment reference to the tab that the field appears on), queryCode indicating the field which is used for query operations, and VersionID.

Figure 5:
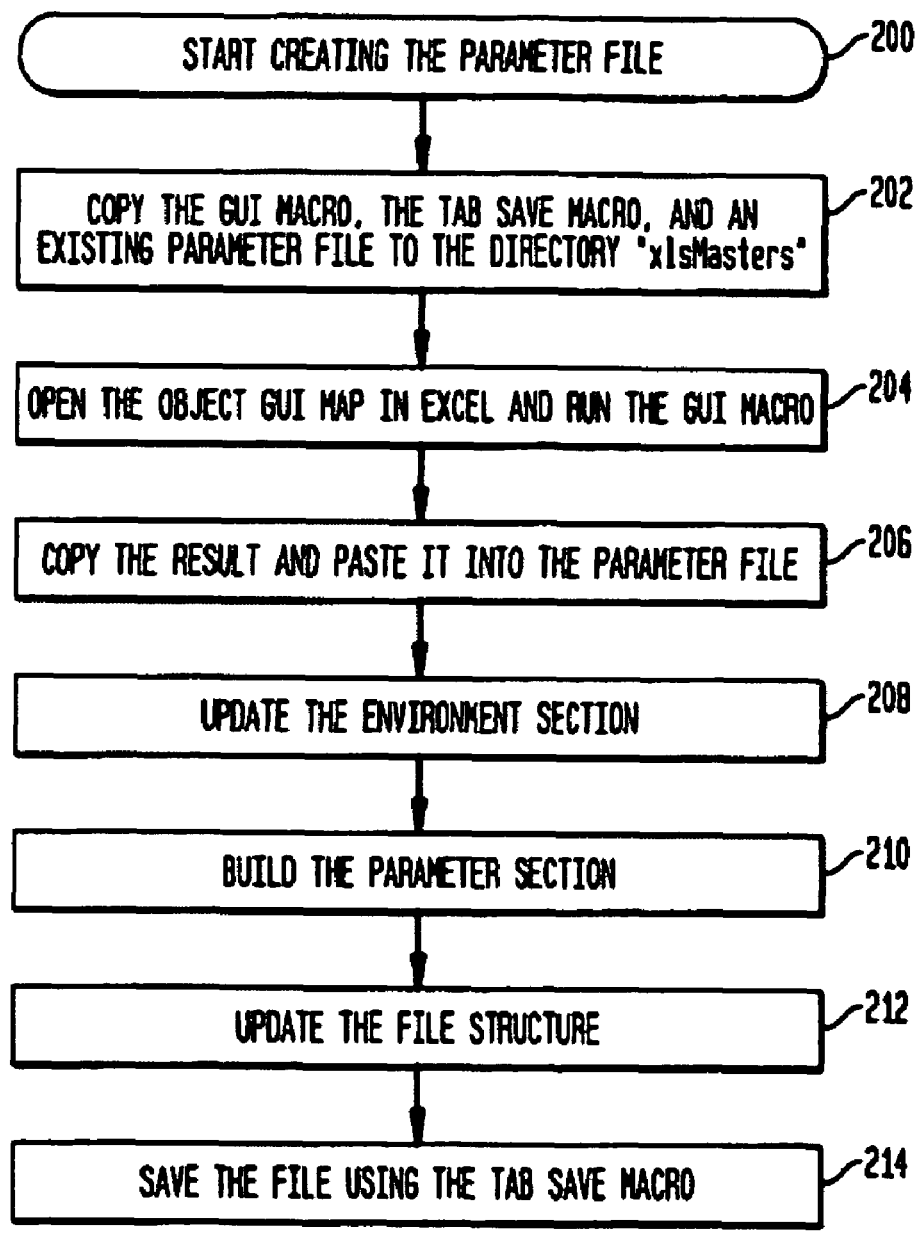
FIG. 5 is a flow chart illustrating the steps in creating a parameter file.

The specific file structure definitions for the parameters file include:
- Column "D1"✓ VersionID=> For subdirectory management
- Column "F1"✓ SystemDB=> Usually "Parameter"
- Column "H1"✓ Object ID=> Name of the file or ID
- HOC=> Author & Date Referring now to FIG. 5, the creation of a parameter file is begun at 200. At 202, the GUI macro, the tab save macro, and an existing parameter file are copied to a directory named xlsMasters. At 204, the object GUI map is opened in Microsoft® Excel® and the GUI macro is executed. The result is copied and pasted into the parameter file at 206. The environment section of the file is updated at 208. The parameter section is built at 210 and the file structure is updated at 212. The file is saved at 214 using the tab save macro.

As mentioned above, an exemplary test engine script is provided on the CDROM appendix in the directory entitled "engine". The script includes several files and functions which are described generally as follows. Details of the functionality and the operation or use of these library functions can be found in the header section of each module and/or function within each module. Each module also contains a HOC (History of Change) section.

The file entitled "Actions" contains the functions to handle the PreAmble and PostAmble actions of the test cases.

The function "ApplicationSpecific" contains general functions that are always application specific. These functions are utilized by other modules of the test engine script. They must always be modified for specific operation of the application being tested.

The file entitled "Common2All" contains functions for all common procedure test cases. This module controls the main flow and logic for the test engine.

The file entitled "General" contains miscellaneous functions to handle loading of GUI map files, opening of the specific test object, file I/O and several wait functions required during test execution.

The function "EngineInit" is loaded automatically by WinRunner® (per the wrun.ini file). It initializes the physical GUI recognition parameters that have been carefully defined for the application. Usually this module applies to ALL versions of the application under test.

The file entitled "ParmSetCheck" has two functions 'SetField' and 'CheckField' which are used to handle the field value assignment and validation based on the input data. Application specific processing must be provided for recognizing error and success conditions.

The file "SiteInitVxx" varies between testers at each different test site (workstation/PC and User). It contains several global variable definitions that allow the individual tester to specify alternate parameters and characteristics that may be unique to the location and or purpose of the test (e.g. test engine development as compared to test execution). Most variables are defined as a constant in this file in order to insure that they do not get overwritten during test processing.

The file entitled "TestInit" defines all global variables required by the test engine.

The file entitled "CustomSupport" provides the parameter Set and Check functions required to support the Custom Grid Objects Tables or other 3$^{rd}$ party vendor supplied object constructions or class structures.

The file entitled "obj_main" provides the interface between the individual Batch files and the test engine. Primarily it creates and initializes some more complicated path variables based on previous definitions and the formal parameter that defines the "Object Under Test"; forces a reload of the necessary library modules; and initializes the environment, exception handling and the main test engine.

The function "PrePostActions_Init" declares and initializes global variables that are usually application specific for the recognition and processing of user actions. The values defined here are used in the test data drive files and are processed in the module entitled "Actions".

The file entitled "Setbaselines" uses as input the Parameter File (environment and parameter definitions) for the Object Under Test. The information from the parameter file is read into specific test engine data structures in order to establish the "Environment" required by the test engine. The data in the parameter file also defines the structure of the required data drive files.

The file "PopUpHandler" contains functions that are used throughout the test engine. These functions are specific to dealing with pop-up windows that are presented to the user during the course of the operation of the application under test. Most of the logic in this module is application specific although the functions themselves are test engine specific. Initialization, activation, deactivation, recognition and processing of Error, Warning and Information pop-up windows is provided.

There have been described and illustrated herein methods and apparatus for environment based data driven testing of computer programs which have a graphical user interface (GUI). While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. A method of generating a data structure for use with a graphical user interface (GUI) test tool, said GUI test tool exercising a plurality of different GUI application objects using data structured according to said data structure to test a software application interfaced with said GUI test tool through said GUI, said method comprising:
opening a spreadsheet file;
defining a GUI environment part of the data structure in said spreadsheet file for said plurality of different application objects;
defining a plurality of rows in a parameters part of said data structure in said spreadsheet file, each row containing a plurality of columns and each row defining a single test, suitable for use with an automatic test engine, of a given one of the GUI application objects and each column representing a parameter of the given GUI application object;
combining said GUI environment part and said parameters part to generate said data structure, wherein the data structure is used with the automatic test engine that includes at least one GUI environment-independent component having application object dependent variables that are defined by the data structure such that each said at least one GUI environment-independent component is capable of being operative in testing said plurality of different GUI application objects based on a common test script executed by the automatic test engine; and
storing a parameter file in a comma delimited file structured by said data structure, said parameter file being stored in storage for testing said plurality of different GUI application objects by the automatic test engine.

2. The method according to claim 1, further comprising: defining one or more rows of data with each object test, multiple rows being selectively defined for at least one object to facilitate or verify the results of a corresponding individual object test.

3. The method according to claim 2, wherein: defining said one or more rows comprises defining multiple rows of data beginning with a first line of data containing a definition of default values that are expected for each parameter.

4. The method according to claim 3, wherein: the first line of data is followed by one or more rows of individual data driven tests.

5. The method according to claim 4, wherein: each of the one or more rows includes standard fields and data specific for each field of an object being tested.

6. The method according to claim 5, wherein: the standard fields include a Test ID, Preamble and Postamble action, Expected Result indication and a Comment.

7. The method according to claim 6, wherein: Preamble and Postamble actions are application specific and represent user actions required to establish a starting point for a test and an action to perform to execute a desired object test.

8. The method according to claim 6, wherein: the expected result field indicates whether a test will pass completely or fail during data entry, during the execution of the postamble or during verification after the postamble action has been executed.

9. The method according to claim 6, wherein: data that appears in individual fields of a data driven test are specific for a parameter, operation or use of said field.

10. The method according to claim 9, wherein: at least one of the fields includes an indication selected from the group consisting of ignored, changed, left alone and ignored for Query operations.

11. The method according to claim 10, wherein: data represents multiple columns of a table structure.

12. The method according to claim 1, further comprising the step of: retrieving said parameter file from said storage, said parameter file being provided to said automatic test engine with a GUI test driver, said automatic test engine testing a feature responsive to said parameter file, driven by said GUI test driver.

13. The method according to claim 12, further comprising generating said parameter file, generating said parameter file comprising:
operating a GUI macro on a GUI map;
inserting the result of operating said GUI macro in said spreadsheet;
updating an environment part of said spreadsheet;
defining individual fields in said parameters part of said spreadsheet;
storing said parameter file as said comma delimited file; and
providing said parameter file for testing a respective GUI application object.

14. The method according to claim 13, wherein: values found in the parameter file are tightly bound to logical names that are used in said GUI map.

15. A method of automatically generating a data structure in a computer system for use with a graphical user interface (GUI) test tool, said GUI test tool exercising a plurality of different GUI application objects using data structured according to said data structure to test a software application interfaced with said GUI test tool through said GUI, said method comprising:
opening a spreadsheet file;

defining a GUI environment part of a data structure in said spreadsheet file that includes information that specifies a GUI environment for each application object;

defining a parameters part of the data structure in said spreadsheet file that includes individual fields that appear in at least one of said application objects;

combining said GUI environment part and said parameters part to generate said data structure, wherein the data structure is used with the automatic test engine that includes at least one GUI environment-independent component having application object dependent variables that are defined by the data structure such that each said at least one GUI environment-independent component is capable of being operative in testing said plurality of different GUI application objects based on a common test script executed by the automatic test engine; and storing a parameter file in a comma delimited file structured by said data structure, said parameter file being stored in storage for testing said plurality of different GUI application objects by the automatic test engine.

16. The method according to claim 15, wherein: the individual fields include a "type" definition.

17. The method according to claim 15, further comprising: identifying parameter elements that are new to a specific version of an application.

18. The method according to claim 15, wherein: the parameter file is organized in rows and columns.

19. The method according to claim 18, wherein: the parameter file is a comma delimited text file.

20. The method according to claim 15, wherein the environment part of the parameter file includes information that specifies Application Name, Launch Menu, Primary Window identification, Tab and related tab windows for each application object.

* * * * *